United States Patent
Hijazi et al.

(10) Patent No.: US 10,599,505 B1
(45) Date of Patent: Mar. 24, 2020

(54) EVENT HANDLING SYSTEM WITH ESCALATION SUPPRESSION

(71) Applicant: Amazon Technologies, Inc., Seattle, WA (US)

(72) Inventors: Shadie Hijazi, Seattle, WA (US); Brett Lounsbury, Phoenix, AZ (US); FNU Arun Kumar Agarwal, Seattle, WA (US); Stacie Lauren Buckingham, Seattle, WA (US); Nick Ciubotariu, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 15/818,037

(22) Filed: Nov. 20, 2017

(51) Int. Cl.
*G06F 11/07* (2006.01)
*G06F 11/30* (2006.01)

(52) U.S. Cl.
CPC ...... *G06F 11/0781* (2013.01); *G06F 11/0709* (2013.01); *G06F 11/3072* (2013.01); *G06F 2201/81* (2013.01)

(58) Field of Classification Search
CPC ............ G06F 11/0709; G06F 11/0754; G06F 11/076; G06F 11/0772; G06F 11/0781; G06F 11/79; G06F 11/3072; G06F 11/3075; G06F 11/3082; G06F 2201/81; G06F 2201/86; G06F 2201/88; H04L 41/0604; H04L 41/0609; H04L 41/0627; H04L 41/0631; H04L 43/16; H04L 43/0823; H04L 63/1416; H04L 63/1425
See application file for complete search history.

(56) References Cited

U.S. PATENT DOCUMENTS

| | | | | |
|---|---|---|---|---|
| 6,255,943 B1* | 7/2001 | Lewis | ................... | H04L 41/042 340/506 |
| 8,417,809 B1* | 4/2013 | Lancaster | ........... | G06F 11/0727 709/224 |
| 2002/0046275 A1* | 4/2002 | Crosbie | ................. | G06F 21/552 709/224 |
| 2008/0316015 A1* | 12/2008 | Naedele | .............. | H04L 41/0613 340/506 |
| 2014/0013167 A1* | 1/2014 | Yuuki | ................. | G06F 11/0751 714/48 |
| 2015/0280969 A1* | 10/2015 | Gates | ................... | G06F 11/0709 714/37 |
| 2015/0288557 A1* | 10/2015 | Gates | ................... | G06F 11/0709 714/37 |

(Continued)

*Primary Examiner* — Gabriel Chu
(74) *Attorney, Agent, or Firm* — Kilpatrick Townsend & Stockton LLP

(57) ABSTRACT

Described herein are systems and techniques for an event handling system capable of distinguishing between application or user-specific events and system-wide events. The described system may be further capable of suppressing event notifications associated with application or user specific events and escalating system-wide events. In some embodiments, the system may identify an origination source for a number of event trigger. The system may determine whether a number of trigger events associated with any particular origination source are over a threshold number of trigger events. Upon determining that the event is an application or user specific event, then the system may suppress a potential escalation of the event.

19 Claims, 6 Drawing Sheets

(56) References Cited

U.S. PATENT DOCUMENTS

2015/0365309 A1* 12/2015 Kaminski ............... H04L 47/70
709/224
2016/0080223 A1* 3/2016 Shubs, Jr. ........... H04L 41/0609
709/224

* cited by examiner

EVENT HANDLING SYSTEM WITH ESCALATION SUPPRESSION

BACKGROUND

Providers of software support services (e.g., web service providers) typically employ event handling systems in order to provide an appropriate level of service to users of those software support services. The functionality provided by a software support service are often provided via application programming interfaces (APIs), which may be called from a downstream software application or module that relies upon the software support service. When triggers occur with respect to the software support service, an event may be triggered, which may indicate a number of possible issues. For example, an event may indicate that an API call made by a supported software application was invalid, a user is attempting to abuse the support service, the support service is currently unavailable (e.g., the support service has crashed), or any number of other suitable issues. If a number of triggers have been received with respect to a single event, that event may be escalated in order to prevent potential downtime for downstream software applications that rely upon the software support service.

An event may typically be escalated by assigning it to an event specialist or software developer. In a scenario in which the event occurs outside of the normal operating hours of the provider of the support service for which the event has been triggered, an event specialist may be contacted at home, often resulting in the accrual of overtime hours and other inefficient resource usage. If the event has been triggered because of an invalid API call or an attempted abuse of the support service, then the result is often a waste of time and resources. However, conventional event handling systems are often incapable of determining when an event should and should not be escalated.

Embodiments of the invention address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
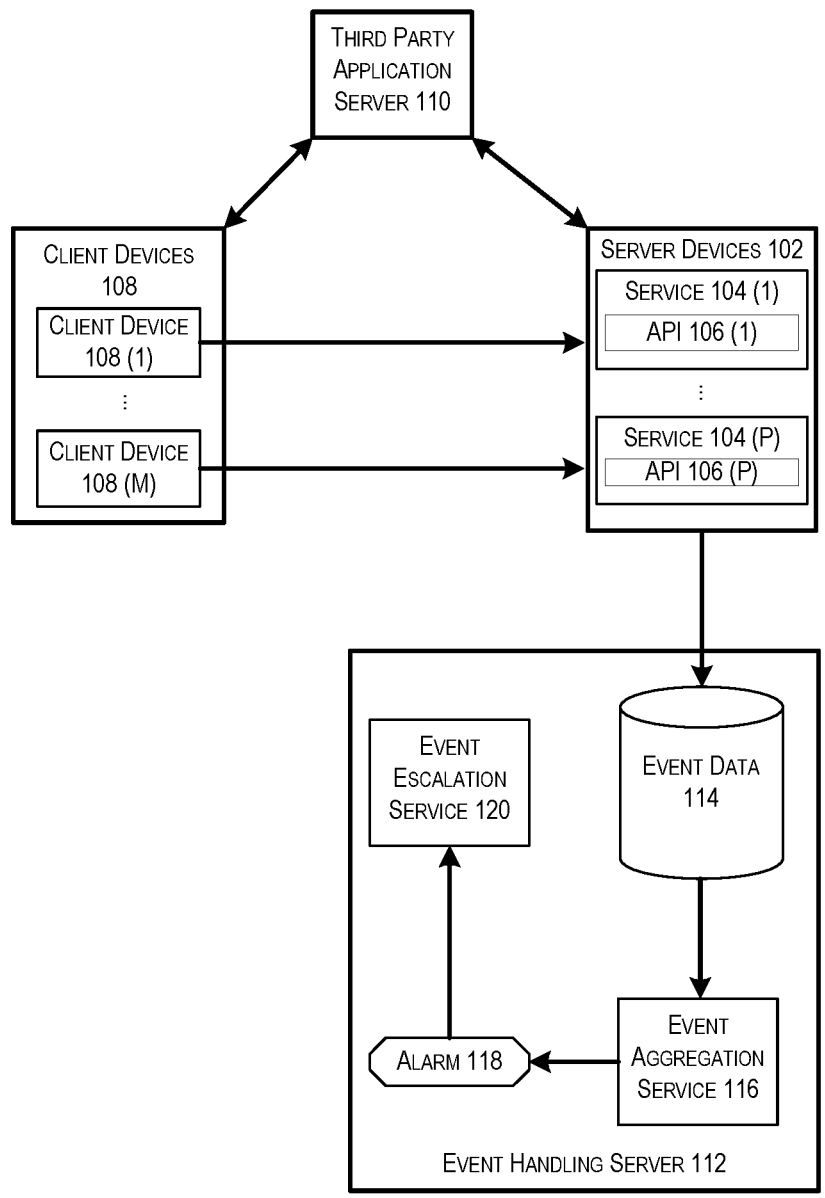
FIG. 1 depicts an illustrative example of an interaction between various components of a system capable of suppressing event escalations in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The present disclosure relates to event detection, and more particularly to a computerized system and method for detecting events that impact a provided service. Various embodiments of the disclosure are directed to aggregating event data related to one or more services in order to identify an impact of an event upon a particular service. In some embodiments, the system may, upon determining that the impact of the event is greater than an acceptable impact (e.g., exceeds some threshold level of impact), determine whether the event is likely caused by a single user/product or some trigger in the support service itself. The impact that an event has on a support service may refer to a degree to which the event is likely to cause, or has caused, some difference in the level of service or functionality provided by the support service. For example, an event may be determined to severely impact a support service if the event causes the support service to be unavailable. In a second example, an event may be determined to have a small impact on a support service if the event causes the support service to have slightly longer wait times.

In accordance with at least some embodiments, the current disclosure is directed to an event handling system which first determines whether an event related to a provided service is severe, and then determines whether the event should be escalated. For example, the system may first determine whether it has received a number of event notifications with respect to the service which is greater than a threshold number of event notifications for a given period of time. This may indicate that an event is severe, which might typically result in an escalation of the event.

In some embodiments, once an event is determined to be severe (and therefore worthy of being escalated), the system may determine whether any potential escalation of the event should be suppressed after determining whether the event is system wide or particular to a single user or downstream product. To do this, the system may assess various factors associated with the event notifications received. For example, the system may, upon determining that the majority of event notifications pertain to a particular downstream software application, determine that a cause of the event is likely the downstream software application as opposed to the support service. In this example, the system may elect to suppress an escalation of the event in order to conserve resources. In some embodiments, an origination identifier is used to identify a downstream application and/or user that caused each trigger to occur, enabling the system to assess what portion of the event was caused by a single user or downstream application.

FIG. 1 depicts an illustrative example of an interaction between various components of a system capable of suppressing event escalations in accordance with at least some embodiments. In FIG. 1, a number of server devices 102 may be made available which are configured to execute a number of support services 104 (e.g., services 1-P). Each of the support services 104 (1-P) may be associated with various application programming interfaces (APIs) 106 1-P. The services 104 1-P may be made available to a number of client devices 108 (1-M). In FIG. 1, it should be noted that P and M are positive integers. In some embodiments, a third party application server 110 may be in communication with the server devices 102 and/or the client devices 108 (1-M). In some embodiments, triggers detected by the server devices 102 in relation to the services 104 may be reported to an event handling server 112.

In accordance with at least some embodiments, a server device may be any powerful computer device or cluster of computer devices. For example, the server device can be a large mainframe computer, a minicomputer cluster, or a group of server devices functioning as a unit. In one example, the server device may be a database server coupled to a Web server. The server device may be coupled to a database and may include any hardware, software, other logic, or combination of the preceding for servicing the requests from one or more client devices 108. The server device may comprise one or more computational apparatuses and may use any of a variety of computing structures, arrangements, and compilations for servicing the requests from one or more client devices 108. A service 104 may be include any set of functionality provided by one electronic device (e.g., server device 102) to another electronic device (e.g., client device 108). In some embodiments, a service may refer to any application intended to provide a specialized function or access to a specialized resource. The functionality provided via the service 104 may be implemented with the use of an API (e.g., via an API call made by an application on the client device 108). An API may be a set of subroutine definitions, protocols, and/or tools for implementing functionality provided by a service. An API may include specifications for routines, data structures, object classes, variables or remote calls that may be performed with respect to a service 104.

In accordance with at least some embodiments, a client device 108 may be any electronic device capable of establishing a communication session with another electronic device (e.g., an application server) and transmitting/receiving data from that device. A client device 108 may include the ability to download and/or execute mobile applications. Client devices 108 may include mobile communication devices as well as personal computers and thin-client devices.

The event handling server 112 may be any suitable computing device configured to aggregate event data, identify an event that impacts the availability of one or more services 104 executed on the server 102, and determine whether that event should be escalated. To do this, the event handling server 112 may receive a plurality of event data 114. In some embodiments, an indication of an event may be provided by an event listener. In some embodiments, information related to an event may be obtained by parsing a server log file associated with the server devices 102 and retrieving trigger information from the server log file. Once a plurality of event data 114 is obtained, an event aggregation service 116 may aggregate events related to a particular service 104. For example, the event aggregation service 116 may identify, within the event data 114, a source for each of the events. For example, the event aggregation service 116 may identify a service and/or a method call associated with a particular service which triggered a trigger. The aggregation service 116 may then aggregate triggers originating from a particular service to identify events for which a number of triggers have been received over a predetermined threshold number of triggers. The event handling server 112, upon determining that over a threshold number of triggers have been received with respect to a particular event, may then determine that an alarm notification 118 should be triggered and forwarded to an event escalation service 120. The event escalation service 120 may then cause the event to be addressed (e.g., by notifying a developer or specialist).

In some embodiments, the event aggregation service 116 may be configured to determine whether the event is specific to a particular downstream software application or user or whether the event is a system-wide event. To do this, the event aggregation service 116 may identify an origination source (e.g., an internet protocol (IP) address or other suitable address) associated with each trigger received in relation to an event. If the event aggregation service 116 determines that over a predetermined portion of the triggers received with respect to an event originate from a particular origination source (e.g., a particular downstream application or user), then the event aggregation service 116 may determine that the event is user-specific and may subsequently prevent the escalation of the event. For example, upon determining that more than 25% of the triggers related to an event that impacts a service originate from a particular mobile application that makes API calls to the service, the event aggregation service 116 may suppress the creation of the alarm notification 118.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
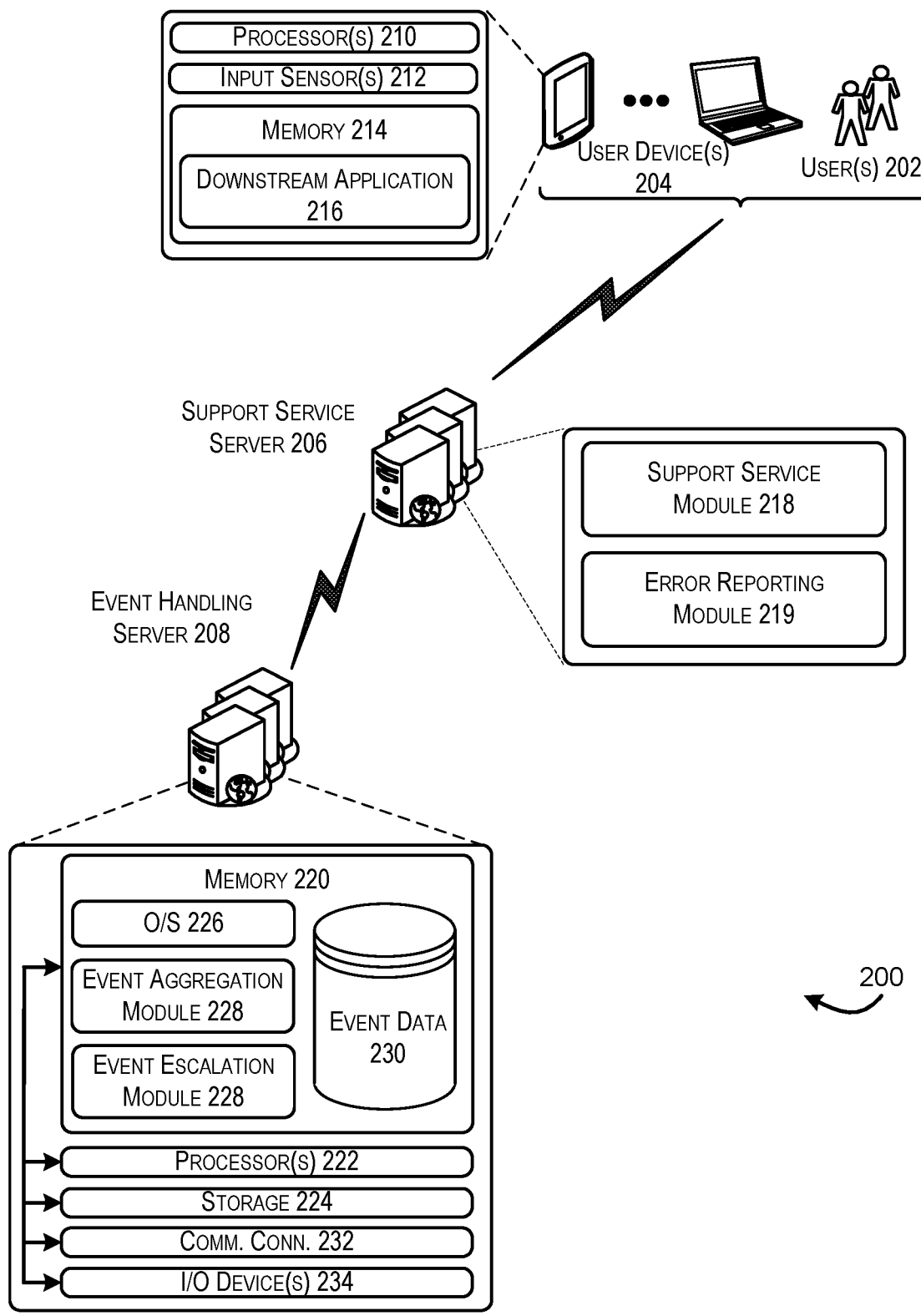
FIG. 2 depicts an illustrative example of a system or architecture in which techniques for identifying user/application-specific events and suppressing alarm notifications associated with those events may be implemented.

FIG. 2 depicts an illustrative example of a system or architecture 200 in which techniques for identifying user/application specific events and suppressing alarm notifications associated with those events may be implemented. In architecture 200, one or more consumers and/or users 202 may utilize user devices 204. In some examples, the user devices 204 may be in communication with a support service server 206 via one or more network connections. The support service server 206 may further be in communication with an event handling server 208.

The user devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

Turning to the contents of the memory 214 in more detail, the memory 214 may include a downstream application 216 that is configured to make an API call to, or otherwise consume, a support service provided by the support service server 206. It should be noted that a user device 204 may be a mobile device (e.g., a smart phone) which is in communication with one or more backend servers that provide processing support for various applications installed upon the user device 204. In this scenario, the downstream application 218 may be a mobile application that causes the user device 204 to communicate with a server operated by a third-party provider of the downstream application 218. In some cases, the API call or other interaction with the support service server 206 may be executed by the server operated by the third-party provider.

As described briefly above, the mobile application 216 may allow the users 202 to interact with a support service server 206, such as to store, access, and/or manage data, develop and/or deploy computer applications, and/or interact with web content. The one or more support service servers 206, perhaps arranged in a cluster of servers or as a server farm, may be configured to host a website (or combination of websites) viewable via the user device 204 or a web browser accessible by a user device 204 via the downstream application 216. Although depicted in memory of the user device 204 in this example, in some embodiments the downstream application 216 may be hosted at a server. For example, the user device 204 may be a thin client device capable of accessing a downstream application 216 remotely. The downstream application 216 may be capable of handling requests from many users 202 and serving, in response, various user interfaces that can be rendered at the user device 204. The downstream application 216 may be any type of application or interface that supports user interaction with a support service provided by a support service server 206. As discussed above, the described techniques can similarly be implemented outside of the downstream application 216, such as with other applications running on the user device 204. In some embodiments, each mobile application that uses a downstream service may be assigned an application identifier by the support service. In some embodiments, each instance of the mobile application installed upon a user device 204 may be assigned a user or customer identifier. For example, a particular mobile application may generally be assigned an application identifier of 1234567, whereas a particular user of that mobile application may be assigned a user identifier of abcdef. In this example, the application identifier and the user identifier may be concatenated into an origination identifier (e.g., 1234567.abcdef), which may be passed to a service API as a parameter value.

The support service server 206 may be any type of computing device such as, but not limited to, a mobile phone, a smart phone, a personal digital assistant (PDA), a laptop computer, a desktop computer, a server computer, a thin-client device, a tablet PC, etc. In accordance with embodiments of the disclosure, the support service server 206 may be configured to execute a support service module 218, which may include an API for various support services, and a trigger reporting module 219, which may provide trigger handling services with respect to the support services provided via the support service module 218. In some embodiments, calls in the API may require that an origination identifier be passed in as a parameter.

Similar to the support service server, the event handling server 208 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the event handling server 208 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the event handling server 208 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 222, as well as data generated during the execution of these programs. Depending on the configuration and type of event handling server 208, the memory 220 may be volatile (such as random access memory (RAM)) and/or non-volatile (such as read-only memory (ROM), flash memory, etc.). The event handling server 208 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for aggregating event data in order to assess the severity of an event (event aggregation module 228) and/or a module for (event escalation module 230). The memory 220 may also include event data 232, which includes a plurality of event data received with respect to various support services executed on a support service server 206. In some embodiments, the event data 232 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the event handling server 208. The event handling server 208 may also contain communications connection(s) 234 that allow the event handling server 208 to communicate with a stored database, another computing device or server, user terminals, and/or other devices on the network(s) 208. The event handling server 208 may also include input/output (I/O) device(s) and/or ports 236, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing event data 232 and the one or more application programs or services for implementing the features disclosed herein, including an event aggregation module 228 and/or an event escalation module 230.

In some embodiments, the event aggregation module 228 may be configured to, in conjunction with the processors 222, analyze event data 232 received from the support service server 206 with respect to a support service module 218. In some embodiments, the support service module 218 may parse trigger information within the event data 232 to identify a service with respect to which each trigger in the event data 232 was received. In some embodiments, the event aggregation module 228 may determine whether a number of triggers received with respect to any particular service exceeds a threshold level of triggers. Upon determining that the number of triggers for a particular service exceeds a threshold level, the event aggregation module 228 may determine that the event is a severe event, which should be escalated. In some embodiments, the threshold level may be dynamically determined. For example, the threshold level may be calculated based on historical information related to the service (e.g., a historical failure rate for the service, a historical number of triggers for the service, etc.). In this example, the event aggregation module 228 may determine that the event is a severe event if the number of triggers received for a particular service within a period of time is greater than a maximum number of triggers historically received with respect to that service within an equivalent period of time when the service is functioning normally. Once the event aggregation module 228 has determined whether the event is a severe event, the event aggregation module 228 may determine whether to escalate the event or whether to suppress the escalation of the event.

Upon determining that the event is a severe event, the event aggregation module 228 may determine whether an event notification for the event should be escalated or suppressed. In some embodiments, this may involve determining an origination source for each of the service-related triggers in the plurality of event data. The event aggregation module 228 may aggregate triggers in the plurality of event data by origination source in order to determine what portion of the triggers related to a particular service have originated with respect to each origination source. In some embodiments, the event aggregation module 228 may determine whether a number of triggers associated with any particular origination source is greater than a predetermined threshold number of triggers. For example, the event aggregation module 228 may determine whether the number of triggers caused by a particular origination source comprise more than 25% of the total number of triggers for the service. In another example, the event aggregation module 228 may determine whether the number of triggers caused by a particular origination source total more than 100 triggers. Upon determining that the number of triggers caused by a particular origination source have exceeded a predetermined threshold number, the event aggregation module 228 may determine that the event is an application-specific or user-specific event. Upon making that determination, the event aggregation module 228 may suppress an alarm notification that would typically be transmitted to an event escalation module 230. Upon determining that a number of triggers received with respect to each origination source fall below the predetermined threshold, the event aggregation module 228 may transmit an event notification to the event escalation module 230 to cause it to escalate the event.

In some embodiments, the event escalation module 230 may be configured to, in conjunction with the processors 222, receive an indication of an event from the event aggregation module 228 and escalate the event. The event may be escalated by the event escalation module 230 via a ticket system. For example, the event may be associated with a helpdesk ticket. In this example, the ticket may be flagged as urgent and various administrative personnel may be notified of the event. In some embodiments, the event escalation module 230 may cause the event handling server 208 to page or call one or more specialists or software developers.

In some examples, the various components depicted in FIG. 2 may communicate via one or more network connections. A network may include any one or a combination of many different types of networks, such as cable networks, the Internet, wireless networks, cellular networks, and other private and/or public networks. In some embodiments, various components of the system architecture may communicate via a wireless local area network (WLAN) connection, over a landline phone, via a kiosk, or in any other suitable manner. It is also noted that the described techniques may apply in other client/server arrangements (e.g., set-top boxes, etc.), as well as in non-client/server arrangements (e.g., locally stored applications, peer to-peer systems, etc.).

Figure 3:
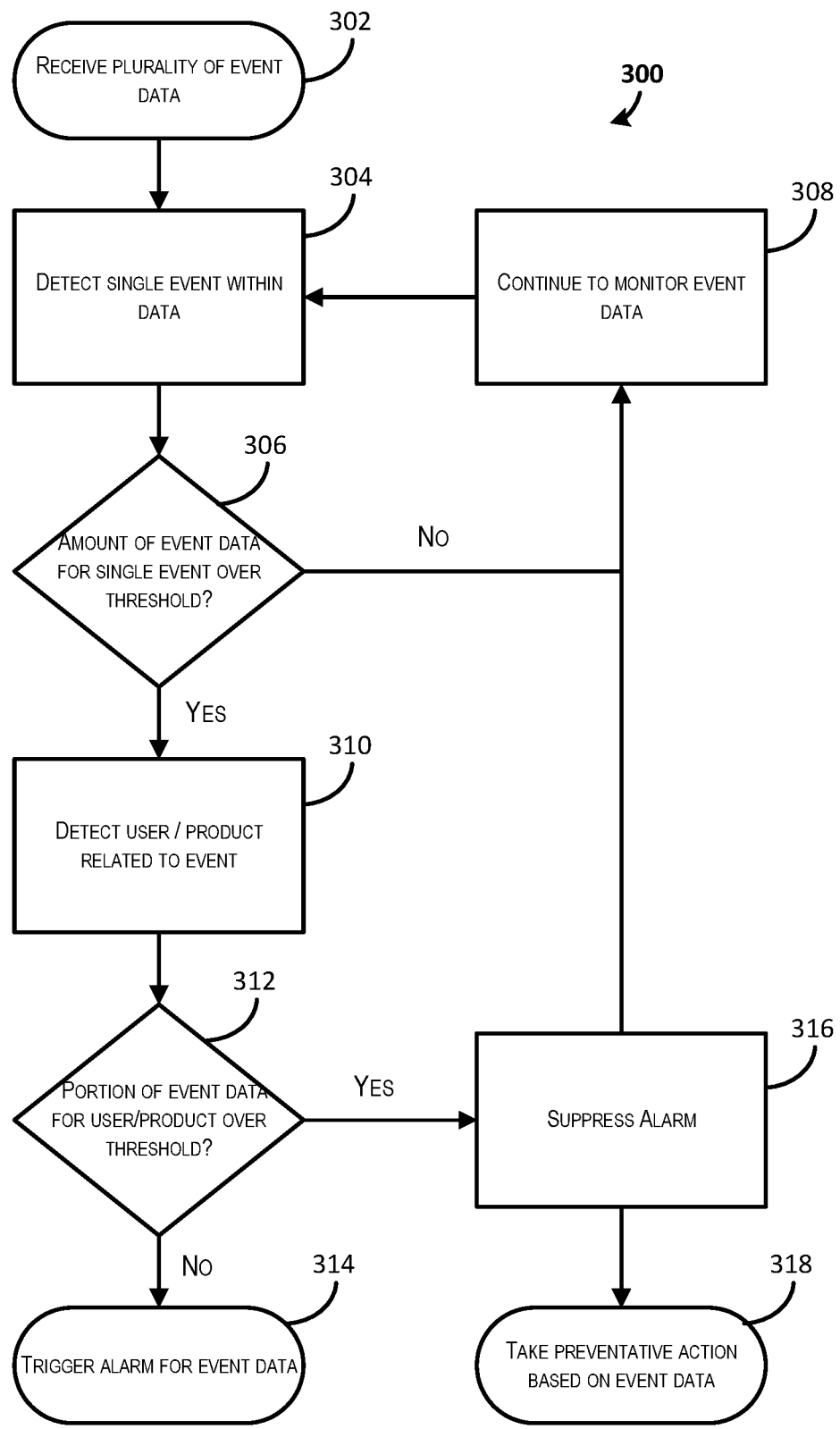
FIG. 3 depicts an illustrative flow chart demonstrating an example event handling system capable of suppressing application-specific event notifications in accordance with at least some embodiments.

FIG. 3 depicts an illustrative flow chart demonstrating an example event handling system capable of suppressing application-specific event notifications in accordance with at least some embodiments. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 may be performed by at least the one or more event handling servers 208 shown in FIG. 2. The code may be stored on a computer-readable storage medium, for example, in the form of a computer program including a plurality of instructions executable by one or more processors. The computer-readable storage medium may be non-transitory.

Process 300 may begin at 302, when a plurality of event data is received by an event handling server. The plurality of event data may include information on triggers received with respect to a number of support services provided by a service provider. In some embodiments, the information in the plurality of event data may include information from trigger logs. In some embodiments, information on triggers received with respect to a particular service may be added to a database of event data specific to that service. In some embodiments, an origination identifier parameter may be added to each call (e.g., API call) associated with a service. In these embodiments, each downstream application and/or user is assigned an identifier unique to that downstream application or user. The application identifier may be passed to the service as a parameter in the call, which may then be associated with any triggers raised by the call. In some embodiments, each application and customer of that application may be assigned separate identifiers that may be appended and passed to the service as a parameter. For example, a downstream application may be assigned ID number 1234567 and a particular customer using that application may be assigned abcdef. In this example, the origination identifier may be 1234567.abcdef. In some cases, the identifier associated with the downstream application may be generated and/or assigned by the service (upon enrollment of the downstream application with a provider of the service) whereas the customer's identifier may be assigned by a provider of the downstream application.

At 304, the process may involve identifying a single event within the event data. In some embodiments, this may involve identifying each event that pertains to a particular service. In some embodiments, this may involve identifying each of the trigger notifications in the plurality of event data specific to a particular type of trigger. For example, the process may involve identifying all triggers caused with respect to a particular API call or method call. In another example, the process may involve identifying all triggers caused when accessing a particular resource.

Once a number of triggers have been identified with respect to a particular event, the process may involve determining whether an event is severe by determining whether that number of triggers have exceeded a predetermined threshold at 306. In some embodiments, the predetermined threshold number of triggers may be determined based upon a historical number of triggers received with respect to a particular service and/or API call within a given period of time. For example, if 10 triggers are received each hour with respect to a particular method, then an event may be determined to be severe upon detecting an increase of 50% in the number of triggers received in an hour (e.g., 15) with respect to that particular method. If the amount of trigger information received with respect to a particular service is not over a threshold number of triggers, then the process may involve continuing to monitor event data at 308.

At 310, the process may involve detecting an origination source (e.g., a user or downstream application) related to each trigger in the plurality of event data. For example, the process may involve identifying an internet protocol address from which a trigger originated. In some embodiments, each trigger for the event may include an origination identifier for the downstream application and/or user that caused the trigger. The origination identifier may be passed to the service via a parameter in a call. In some embodiments, the origination identifier may include an application identifier that indicates a downstream application that uses a support service, as well as a user identifier that indicates a particular user of the downstream application. The origination identifier may include a concatenation of both identifiers. For example, the origination identifier 1234567.abcdef may indicate that the trigger was caused by downstream application 1234567 being used by user abcdef.

At 312, the process may involve determining whether the portion of the data related to the event associated with any particular origination source is over a threshold number. For example, the process may involve determining whether the number of triggers caused by a particular origination source comprise more than 25% of the total number of triggers associated with the event. Upon detecting that the event is severe and that no portion of the event data associated with any particular origination source is over a threshold number, the process may involve escalating the event data (e.g., triggering an alarm for the event data) at 314. Upon detecting that the event is severe and that a portion of the event data associated with at least one particular origination source is over a threshold number, the process may involve suppressing an escalation of the event data at 316. It should be noted that the process need not necessarily determine an identity of the user or the downstream application. Instead, the process may merely determine whether the origination source is the same for multiple triggers.

In some embodiments, the process may involve preventing further event data from being received from a particular origination source at 318. For example, the process may involve blocking a downstream application that caused the majority of triggers from using an impacted service for some period of time (e.g., 24 hours). In some embodiments, the process may involve flagging the origination source so that any event trigger received that originates from that origination source may be ignored or an alarm for any event caused by the origination source may be suppressed automatically. An event trigger may be any indication or notification that some condition has been met. Although the event trigger described herein may relate to a fault or error triggered with respect to a service, an event trigger may also be triggered upon detecting that some threshold value has been exceeded with respect to a particular metric of the support service. In some embodiments, an administrator of the support service may provide the metric to be measured as well as the threshold value. In these embodiments, an event trigger may be generated upon detecting that the provided threshold value has been exceeded for the provided metric.

Figure 4:
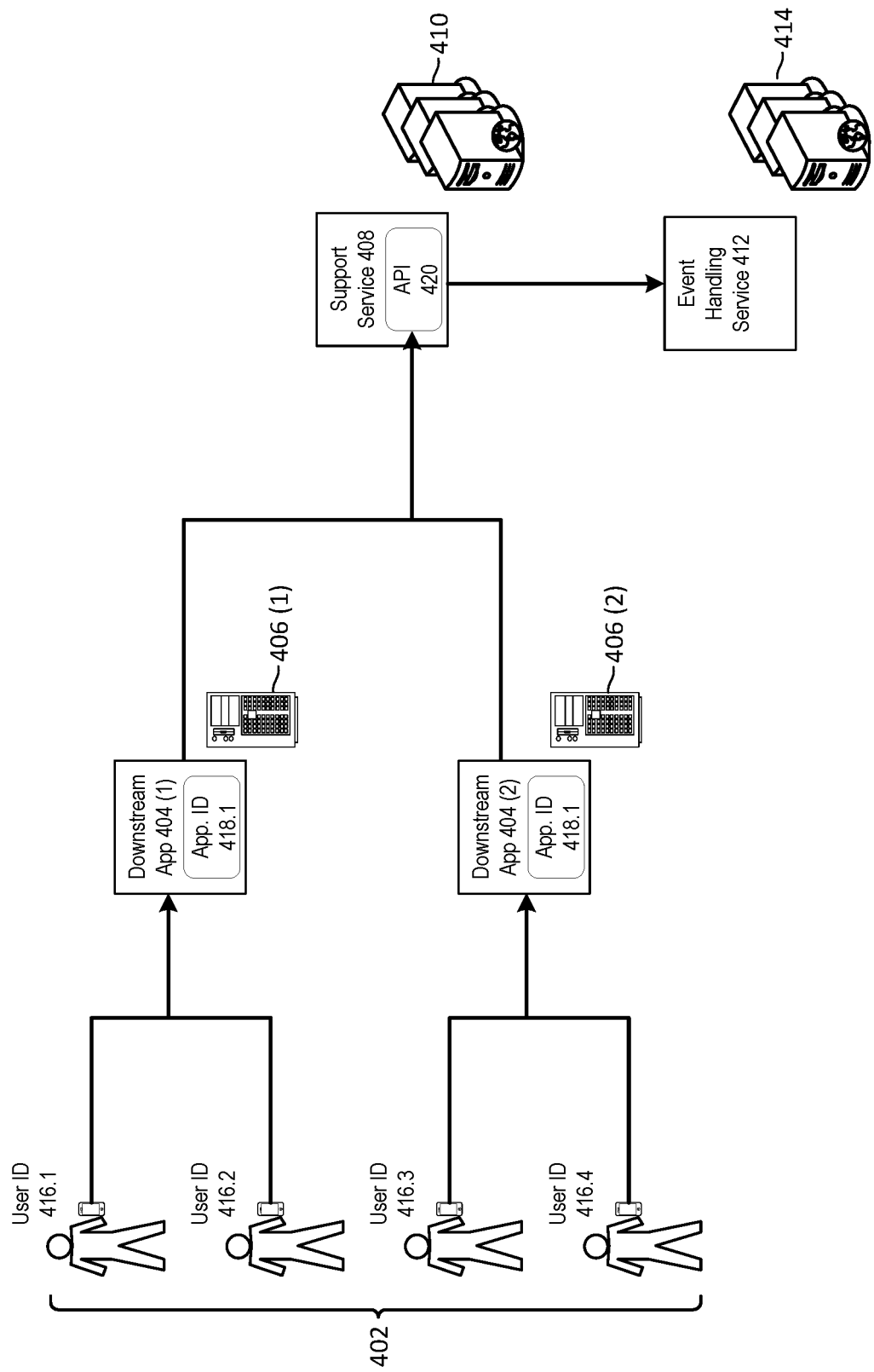
FIG. 4 depicts an illustrative example of a system interaction in which API calls are made using an origination identifier in accordance with at least some embodiments.

FIG. 4 depicts an illustrative example of a system interaction in which API calls are made using an origination identifier in accordance with at least some embodiments. In FIG. 4, a plurality of users 402 may each operate a user device with an instance of a downstream application 404 (1 and 2) installed upon it. The downstream application 404 (1 and 2) may cause each user device to communicate with a respective downstream application server 406 (1 and 2) that provides support for that downstream application 404. Each downstream application 404 may rely upon a support service 408 hosted on a support service server 410. The support service server 410 may be an example of support service server 206 depicted in FIG. 2. The support service server 410 may further communicate errors or faults triggered in the support service 408 to an event handling service 412 implemented on an event handling server 414. The event handling server 414 may be an example of event handling server 208 depicted in FIG. 2.

As depicted in FIG. 4, each of the users 402 may be associated with a user id 416.1-416.4. In some embodiments, each user id 416 may be assigned to an instance of a downstream application 404 or an account maintained with respect to the downstream application. Because each user identifier 416 may be generated and assigned to a user by a downstream application, it should be noted that the user identifier may not be unique, though it may be unique with respect to a particular downstream application. Hence, a single user may have multiple user identifiers 416 for multiple downstream applications. Additionally, each downstream application may be assigned a unique application identifier 418.1-418.2.

In accordance with at least some embodiments, a user may execute an instance of the downstream application 404 installed on his or her user device. Upon execution of the instance of the downstream application 404, the user device may be caused to establish a communication session with the downstream application server 406 and the user device may transmit the user identifier to the downstream application server 406. The downstream application may then cause the downstream application server to perform one or more calls to an API 420 maintained by the support service server 410 with respect to a support service 408 in order to execute some functionality made available via the support service 408. In performing the one or more calls to the API, the downstream application 404 may pass the origination identifier to the support service API 420 (e.g., as a parameter value). Hence, any event trigger with respect to the support service 408 may include the origination identifier, enabling the event handling service to group event triggers by either the application or the user.

Although the downstream application is depicted as being implemented on a downstream application server, it should be noted that some embodiments may involve a direct communication between the user device and the support service server 410. For example, the instance of the downstream application may perform an API call to access functionality or resources provided by the support service 408.

Figure 5:
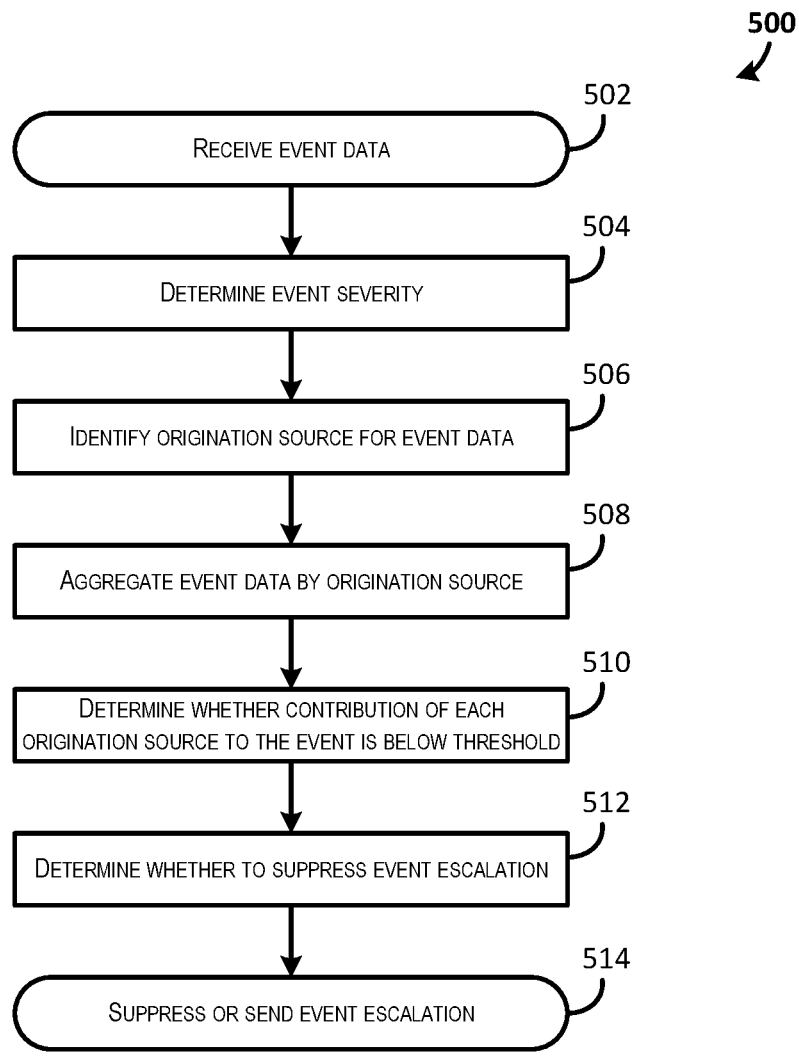
FIG. 5 depicts a flow diagram illustrating a process for receiving event data and determining whether to escalate or suppress a notification for the event based on that event data in accordance with at least some embodiments.

FIG. 5 depicts a flow diagram illustrating a process for receiving event data and determining whether to escalate or suppress a notification for the event based on that event data in accordance with at least some embodiments. In accordance with at least some embodiments, process 500 may be performed by the event handling server 208 depicted in FIG. 2.

Process 500 may begin at 502, when a plurality of event data is received with respect to a number of support services. The event data may contain event trigger information that includes an origination identifier associated with an entity that caused the event trigger. In some embodiments, the plurality of event data may be received with respect to a number of different services.

At 504, the system may determine the severity of an event. To do this, the system may identify a number of trigger events in the plurality of event data associated with a particular service and/or service-related event. The system may aggregate each of the events by their respective service. In some embodiments, the system may further aggregate the event triggers according to the type of trigger associated with the event trigger. For example, the event triggers may be aggregated by a particular type or fault or error. Upon aggregating the event triggers, the system may determine whether a number of the event triggers for any particular service or fault originating from a service have exceeded a threshold number of event triggers. If a number of event triggers associated with a particular downstream application or user exceed the threshold number, then the event may be determined to be severe.

At 506, the system may identify an origination source for each event trigger in the event data. For example, the system may determine a downstream application and/or a user of the downstream application associated with each of the event triggers for a particular event. In this way, the system may aggregate event data by origination source at 508. For example, the system may identify a downstream application and/or user from an origination identifier. In this example, the origination identifier may include a concatenation of an application identifier used to identify a downstream application and a user identifier used to identify a user of the downstream application.

At 510, the system may determine whether a contribution of each origination source to the event is above or below a threshold level of contribution. For example, the system may determine whether the number of triggers caused by a particular origination source comprise more than 25% of the total number of triggers associated with the event. Based on this analysis, the system may determine whether to suppress or escalate the event at 512. Upon detecting that the event is severe and that no portion of the event data associated with any particular origination source is over a threshold number, the system may determine that the event should be escalated. Upon detecting that the event is severe and that a portion of the event data associated with at least one particular origination source is over a threshold number, the system may suppress an escalation of the event data. The system may then either suppress or escalate the event based on the previous determination at 514.

Embodiments of the disclosure provide for a number of advantages over conventional event handling systems. For example, in conventional event handling systems, an event is usually escalated upon determining that a number of faults or errors have been received with respect to the event or upon determining that the support service is not operational and is a critical service. However, in a scenario in which the event is actually caused by a downstream application making an invalid API call as opposed to a fault in the support service being responsible for the event, or in a scenario in which a user is attempting to abuse the support service, this can, and often does, result in wasted resources. For example, when an event is escalated during off hours, a specialist may unnecessarily be contacted and given overtime to handle the issue. Embodiments of the disclosure prevent this unnecessary use of resources by analyzing the source of the triggers that contributed to the event, identifying a source of those triggers to determine whether the event is application/user specific or service specific, and suppressing the escalation of the event upon determining that the event is application/user specific. Accordingly, embodiments of the disclosure provide for improved functionality over conventional event handling systems.

Figure 6:
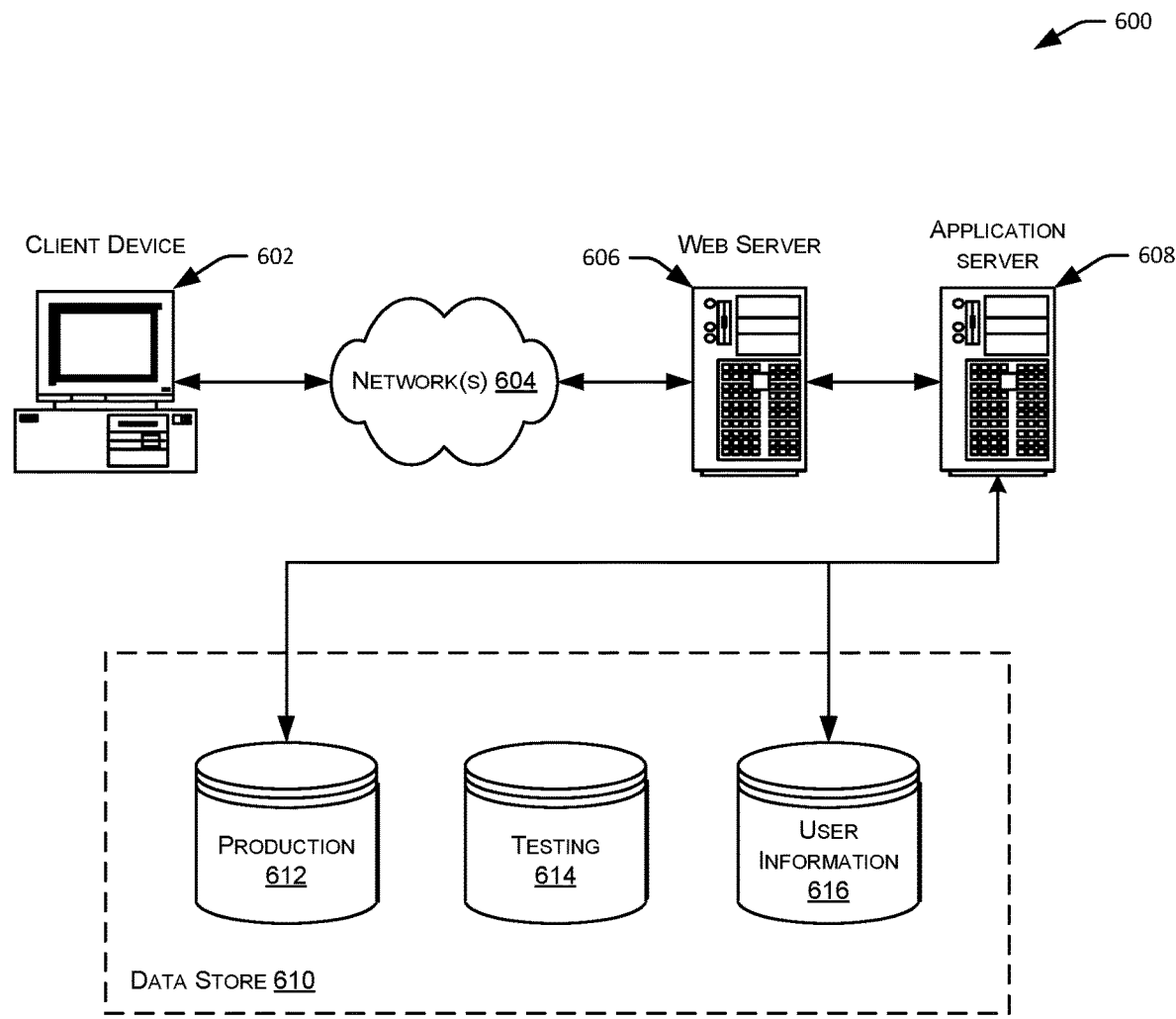
FIG. 6 illustrates aspects of an example environment for implementing aspects in accordance with various embodiments.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a plurality of event data from a number of support service servers comprising information on an event impacting one or more services;
   determining, based on the received plurality of event data, that the impact to the one or more services exceeds a threshold level of impact for the one or more services;
   identifying an origination source for each of the plurality of event data;

aggregating event data related to each identified origination source in order to calculate a contribution for each identified origination source based on a quantity of event data originating at the origination source;

determining whether the contribution for at least one origination source exceeds a predetermined contribution threshold;

upon determining that the contribution threshold has not been exceeded, transmitting an alarm notification in relation to the event; and upon determining that the contribution for at least one origination source exceeds the predetermined contribution threshold, suppressing the alarm notification that would otherwise be transmitted in relation to the event.

2. The computer-implemented method of claim 1, wherein the threshold level of impact for the one or more services is received from a user.

3. The computer-implemented method of claim 1, wherein the origination source comprises at least one of a downstream application that relies upon the one or more services or a user accessing the one or more services.

4. The computer-implemented method of claim 1, wherein the origination source is identified based on an internet protocol address associated with the origination source.

5. The computer-implemented method of claim 1, origination source is identified based on an origination identifier included in the event data.

6. A system comprising:
a processor; and
a memory including instructions that, when executed with the processor, cause the system to, at least:
receive event data comprising a number of event triggers from a number of support service servers associated with a service;
determine, based on the number of event triggers, that an impact to the service exceeds a severity threshold level of impact for the service;
identify an origination source for each of the number of event triggers;
determine whether a number of event triggers associated with at least one origination source exceeds a predetermined contribution threshold;
upon determining that the contribution threshold has not been exceeded, escalate an event in relation to the event data; and
upon determining that the number of event triggers associated with at least one origination source exceeds the predetermined contribution threshold, suppress the escalation of the event that would otherwise have occurred in relation to the event.

7. The system of claim 6, wherein the severity threshold is determined based on a historic level of trigger events for the service.

8. The system of claim 6, wherein the event triggers each comprise an origination identifier, wherein an origination source is identified for each of the number of event triggers from the origination identifier.

9. The system of claim 8, wherein the origination identifier comprises an application identifier and a user identifier.

10. The system of claim 6, wherein at least one event trigger is caused by a call to an API for a support service of the support service servers.

11. The system of claim 6, wherein escalating the event in relation to the event data comprises transmitting an indication of the event to an event escalation service.

12. The system of claim 6, wherein escalating the event in relation to the event data comprises notifying a specialist.

13. A non-transitory computer readable medium storing specific computer-executable instructions that, when executed by a processor, cause a computer system to at least:
receive event data from a number of support service servers comprising a number of event triggers associated with a service;
determine, based on the number of event triggers, that an impact to the service exceeds a severity threshold level of impact for the service;
identify an origination source for each of the number of event triggers;
determine whether a number of event triggers associated with at least one origination source exceeds a predetermined contribution threshold;
upon determining that the contribution threshold has not been exceeded, escalate an event in relation to the event data; and
upon determining that the number of event triggers associated with at least one origination source exceeds the predetermined contribution threshold, suppress the escalation of the event that would otherwise have occurred in relation to the event.

14. The computer readable medium of claim 13, wherein the severity threshold is determined based on a historic failure rate for the service.

15. The computer readable medium of claim 13, wherein the origination identifier comprises a concatenation of an application identifier and a user identifier.

16. The computer readable medium of claim 13, wherein the origination source comprises an instance of a downstream application installed upon a user device.

17. The computer readable medium of claim 13, wherein the number of event triggers are caused by faults detected in the service.

18. The computer readable medium of claim 13, wherein the service is a support service that provides access to functionality or a resource.

19. The computer readable medium of claim 13, wherein the number of event triggers are received upon a threshold with respect to a particular metric being exceeded, wherein the metric is provided by an administrator.

\* \* \* \* \*